United States Patent [19]
Johnson et al.

[11] Patent Number: 5,987,135
[45] Date of Patent: Nov. 16, 1999

[54] SYSTEM AND METHOD FOR CONTROLLING AND MONITORING REMOTE DISTRIBUTED PROCESSING SYSTEM

[75] Inventors: Christopher H. Johnson, Oakton; Jerry M. Feinberg, Arlington; Bruce W. Stalcup, Springfield, all of Va.

[73] Assignee: PRC Inc., McLean, Va.

[21] Appl. No.: 08/900,133

[22] Filed: Jul. 25, 1997

[51] Int. Cl.[6] ................ H04L 9/00; G06F 15/16
[52] U.S. Cl. .................... 380/25; 380/4; 380/23; 380/49; 380/50; 380/59; 395/186; 395/187.01; 395/200.31; 395/800.28
[58] Field of Search .................. 380/9, 23, 25, 380/49, 50, 59, 4; 395/200.31, 200.32, 200.33, 800.28, 800.29, 800.3, 800.31, 183.01, 183.08, 183.09, 184.01, 500, 186, 187.01, 188.01

[56] References Cited

U.S. PATENT DOCUMENTS

| | | | |
|---|---|---|---|
| 4,456,994 | 6/1984 | Segarra | 395/183.09 |
| 4,882,752 | 11/1989 | Lindman et al. | 380/25 |
| 5,204,897 | 4/1993 | Wyman | 380/4 |
| 5,745,879 | 4/1998 | Wyman | 380/4 X |
| 5,754,763 | 5/1998 | Bereiter | 380/4 X |

*Primary Examiner*—Bernarr E. Gregory
*Attorney, Agent, or Firm*—Rothwell, Figg, Ernst & Kurz

[57] ABSTRACT

A system and method for controlling and monitoring remote distributed processing systems from one or more control processing systems by downloading agent-application programs from the control processing systems to remote control middleware modules on the distributed processing systems, where the control processing systems have a library of available agent-application(s). The agent-application(s) are compiled by or at the direction of the remote control middleware and executed within operational parameters determined by the control processing systems.

21 Claims, 6 Drawing Sheets

SYSTEM AND METHOD FOR CONTROLLING AND MONITORING REMOTE DISTRIBUTED PROCESSING SYSTEM

BACKGROUND OF THE INVENTION

The present invention relates to a system for permitting a central computer, or a designated set of computers, to manage, control or monitor a large network of remote computer systems. Currently, such a control system is designed and developed as an integral part of the network's initial design, with every desired option or action having been anticipated and engineered as part of the overall system development. This results in a very complex system which is costly, difficult and time-consuming to build, and extraordinarily difficult to modify or expand. For example, if, after the network is installed, the customer determines that he requires a new feature, the existing software must be modified, re-compiled, and the recompiled version installed on all computers in the system—all at great expense and over a long period of time. The present invention obviates this complex and costly process, and can be overlaid on any existing distributed computer system, regardless of operating system or platform.

Other prior art systems such as Object Request Brokers (ORBs) have been developed in recent years to facilitate the exchange of data/files and the interoperability of application programs. ORBs do allow heterogeneous applications to operate together, but require significant set-up time and effort. ORBs do not offer the wide-ranging, flexible, and direct control of remote computers that the present invention offers. In addition, ORBs are not "ad hoc" in the sense that new relationships cannot be set up quickly and run remotely and communicated to a large network of computers as in the present invention. In this sense, ORBs are really not, nor were they intended, to perform the functions that are foreseen for the present invention.

SUMMARY OF THE INVENTION

Accordingly, the present invention provides a system and a method for quickly and efficiently gathering information from, managing, monitoring and controlling distributed remote host processing systems.

In particular, an embodiment of the present invention provides a system for controlling one or more remote host processing systems comprising at least one control processing system having a library of agent-applications, the one or more remote host processing systems each having a remote host processor and remote control middleware, and a communication medium operatively linking the control processing system and the remote host processing systems and wherein the remote control middleware has means for converting any of said agent-applications into machine instructions for the remote host processor of the remote host processing system where the remote control middleware is resident. Preferably, said remote control middleware has means for authenticating applications it receives from said control processing systems, and means for decrypting agent-applications which are encrypted by said control processing systems. Also, preferably, said control processing system has means for creating and modifying said agent-applications. It is also preferable for the agent-applications to be written in a language easily converted into instructions for a variety of types of remote host processors and operating systems.

In another embodiment the preferred invention provides a method for controlling one or more remote host processing systems, each having remote control middleware resident thereon, from at least one control processing system having a library of agent-applications, the method comprising the steps of activating said remote control middleware and transmitting a selected agent-application from the control system to the remotely activated remote control middleware, and converting the transmitted agent-application into instructions for the remote host processor of the remote host processing system on which the activated remote control middleware is resident. Preferably, the agent-applications are encrypted by the control processing system prior to transmission and are decrypted by the remote control middleware after receipt of the agent-applications. Also, preferably, the remote control middleware verifies or authenticates the agent-applications received from the control processing system.

DETAILED DESCRIPTION OF THE INVENTION

Figure 1:
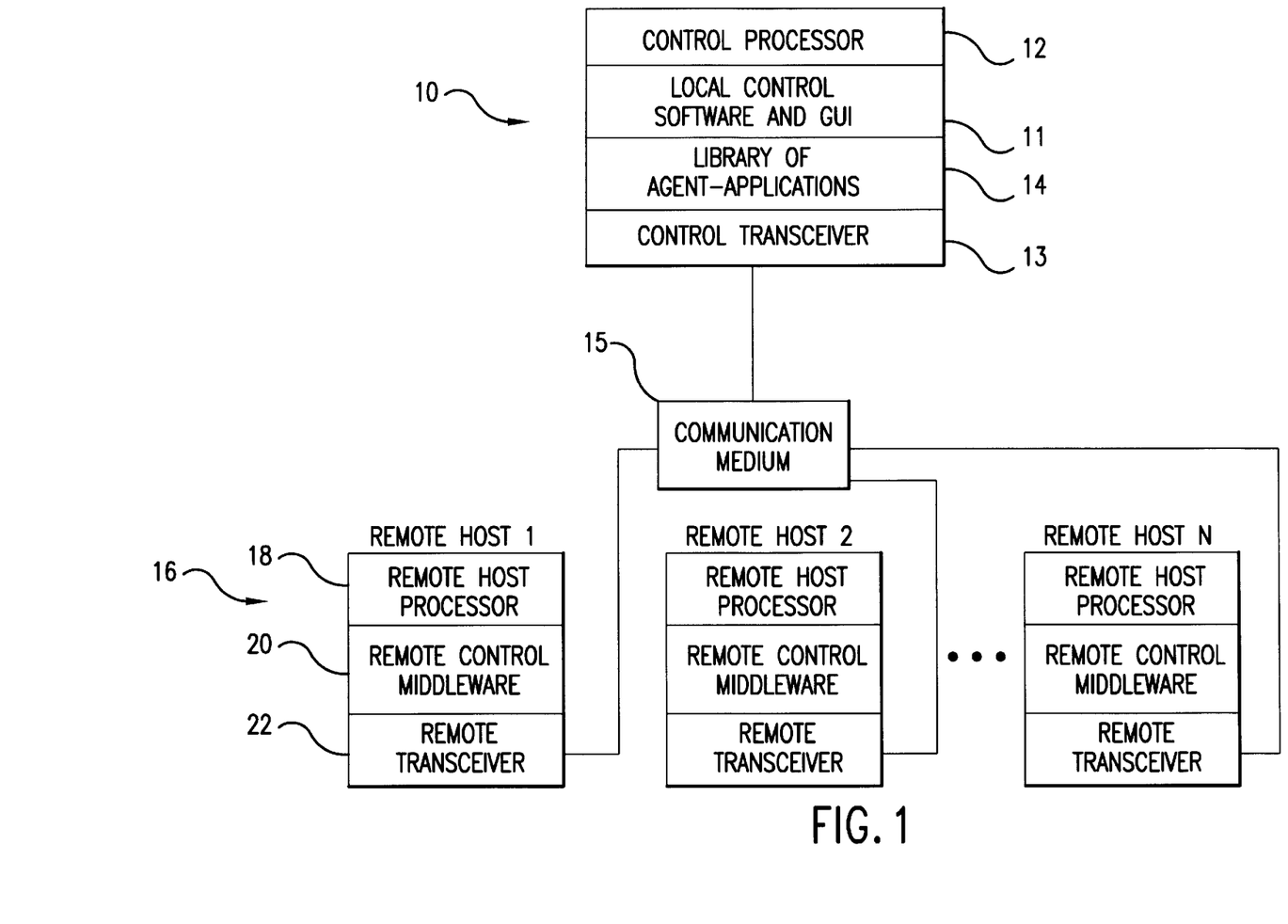
FIG. 1 is a block diagram illustrating a preferred embodiment of the present invention.

FIG. 1 illustrates a preferred embodiment of the present invention which is herein described. A control processing system 10 comprising a control processor 12, local control software and Graphical User Interface ("GUI") 11, a library of agent-applications 14, and a control transceiver 13 is in communication with plural remote host processing systems 16 via a communication medium 15, such as LAN, WAN, satellite, or any other suitable communication medium including the Internet. Said remote host processing systems comprise a remote host processor 18, remote control middleware 20, and remote transceiver 22.

Figure 1A:
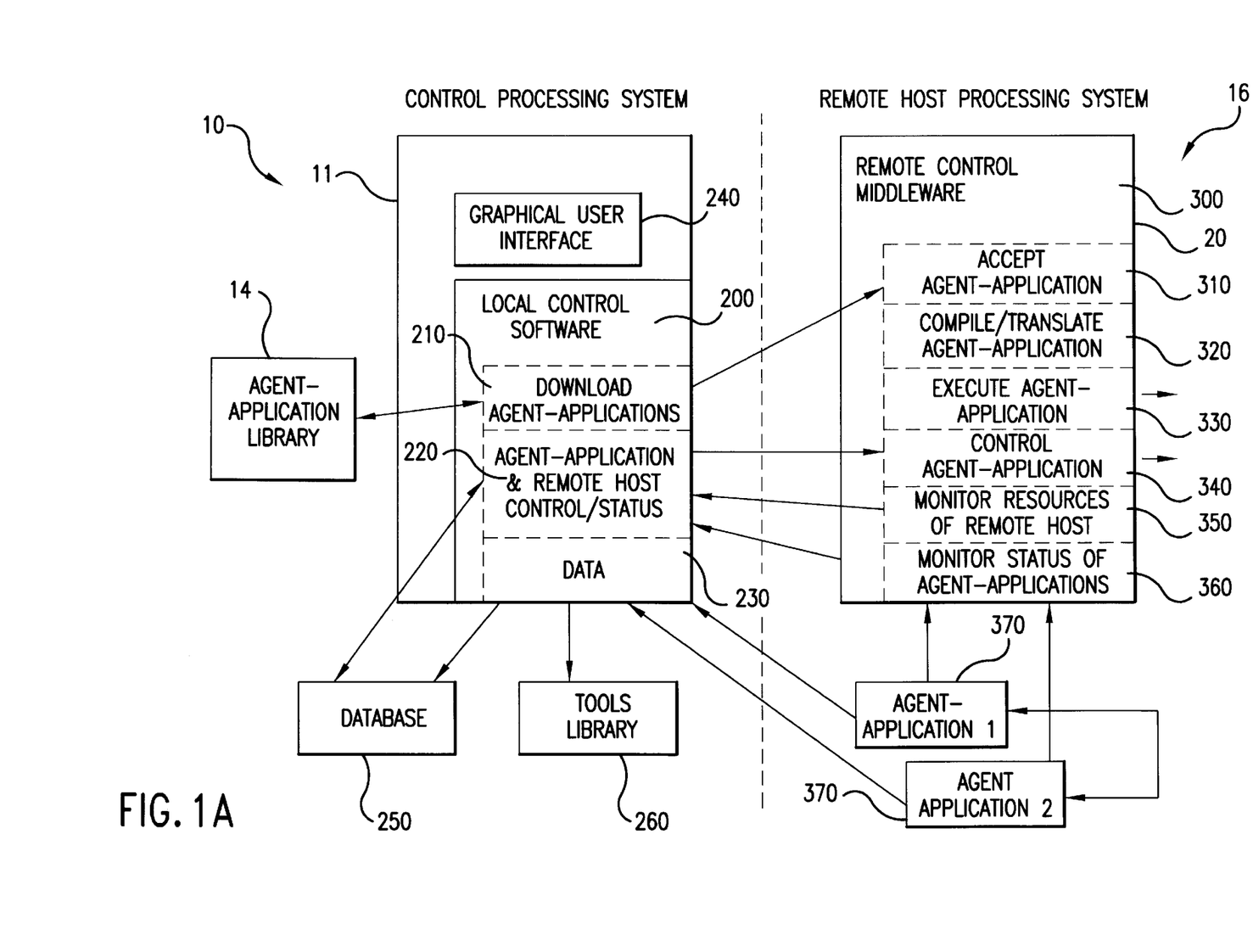
FIG. 1a is a block diagram illustrating a preferred embodiment of the present invention.

FIG. 1A is a simplified diagram showing the relationship between the control processing system 10 and a particular remote host processing system 16 omitting some of the structure shown in FIG. 1 such as remote transceiver 22, control transceiver 13, and communication medium 15 for the purposes of simplification. Graphical user interface 240 provides an interface between a user at the control processing system 10 and the local control software 200. The local control software 200 comprises a download agent-applications module 210, an agent-application and remote host control/status module 220 and means for storing data 230. Remote control middleware 20, resident on remote host processing system 16, comprises an accept agent-application module 310, a compile/translate agent-application module 320, an execute agent-application module 330, a control agent-application module 340, a monitor resources of remote host module 350, and a monitor status of agent-applications module 360. The remote control middleware 20 in a preferred embodiment is software which is logically positioned between the operating system software of the remote host and the agent-applications 370 as they are executed. Preferably, the operating system of the remote host supports multi-tasking and/or multi-threading applications. The multi-tasking/multi-threading support will facilitate the ability of the remote control middleware 20 to run in the background of its remote host processing system 16 without affecting other applications running in the foreground.

When a user selects agent-applications he wishes to download to particular remote host processing systems 16 through the graphical user interface 240 as will be described herein, the download agent-applications module 210 communicates with the agent-applications library 14 to provide the selected agent-applications to the accept agent-applications module 310 on each of the selected remote host processing systems 16.

The accept agent-application module 310 will perform any necessary verification or decryption of the downloaded agent-applications as further described below. If the agent-application is accepted it will be compiled or translated as appropriate by compile/translate agent-application module 320. When it is appropriate per operational instructions, discussed below, or when predefined default conditions are satisfied, the execute agent-application module 330 will cause the compiled or translated agent-application to execute on remote host processor 18. Control agent-application module 340 will control the execution of agent-applications when executing on that remote host processing system, if at all, according to received operational instructions and/or satisfied default conditions. Operational instructions may be sent in a batch either with or without the downloaded agent-applications as they are being downloaded or operational instructions may be received dynamically.

Monitor resources of remote host module 350 monitors the resources of the remote host processing system 16 on which the agent-applications 370 are running such as available hard disk storage space or available random access memory or available computer processing power, and that information is sent back to the agent-application and remote host control/status module 220. By acquiring information regarding the status of resources on the various remote host processing systems, the agent-application and remote host control/status module 220 and/or the user at control processing system 10 through the graphical user interface 240 may terminate or suspend selected agent-applications 370 if too many remote host processing system resources are being consumed by the agent-applications 370. For example, if the agent-applications 370 begin to adversely affect applications running in the foreground of the remote host processing system, selected agent-applications may be terminated or suspended either automatically according to predetermined default conditions or by a user at control processing system 10.

Monitor status of agent-applications module 360 monitors the status of the agent-applications 370 running on the remote host processing system and provides that information to module 220 on the control processing system 10 so that a user at the control processing system 10 or the local control software 200 can determine whether the agent-applications 370 are properly performing.

While the agent-applications 370 can perform many tasks as described below, the primary task of an agent-application in a preferred embodiment is to gather data and return that data to the control processing system 10 to a data module 230 which handles data as it is received and which in a preferred embodiment may provide received data either to a data base 250 and/or a tools library 260. Tools library 260 may comprise any of various software applications either custom designed for a particular purpose or commercial off-the-shelf applications such as word processors, data bases, spreadsheets, etc. Data may also be stored to a data base 250 for later use such as analysis by applications in the tools library 260.

While a single control processing system 10 is shown in FIG. 1, more than one control processing system 10 may be utilized and may be referred to as a control group. Such a control group may have multiple control processing systems 10 each comprising a control processor 12 and library of agent-applications 14 as shown or may have fewer components than processing systems in the group to perform the illustrated functions. For example, a control group comprising plural control processing systems 10 may have but a single library of agent-applications 14 utilized by one or more of the control processing systems 10 in the control group. A further alternative comprises plural control processing systems 10, a single main library of agent-applications, and one or more supplemental libraries of agent-applications where the supplemental libraries have some agent-applications not found in the main library and each control processing system has access to the main library.

Similarly, although multiple remote host processing systems are shown in FIG. 1, the present invention could be practiced with only one remote host processing system. However, each remote host processing system must have remote control middleware to be part of a system practicing the invention.

The control processing system 10 may comprise a computer system such as a main frame (such as an IBM MVS system, mini computer, work station (e.g., DEC Alpha, SUN, SGI, etc.) or a personal computer (e.g., computers based upon microprocessors by Intel, AMD, Cyrix, or Motorola), but may also be a device of more limited application such as one using an Application Specific Integrated Circuit ("ASIC") as a control processor and having a library of agent-applications stored on a Read Only Memory ("ROM") or similar memory device. Remote host processing systems may be similarly implemented with the remote control middleware 20 embodied in some sort of firmware/hardware form such as a ROM or ASIC. However, the preferred embodiments of the control processing system and remote host processing system will generally refer to the personal computer or work station paradigm, but these references should in no way be construed as a limitation upon how the present invention may be practiced or is envisioned.

The communication medium 15 may be any medium for communicating data as are commonly known. For example, Local Area Networks, Wide Area Networks, the Internet, satellite systems, or one or more modems and an appropriate number of telephone lines are all acceptable communications media either individually or in combination for practicing the present invention.

The library of agent-applications 14 may be stored on a hard drive (not shown) which may contain any number of agent-applications. The agent-applications are computer programs which are not restricted in size by the present invention and they are preferably written in a platform and operating system independent language such as Java™. Each agent-application represents a process that a user may want to have carried out on a remote host processing system. For example, agent-applications can easily be built or written to perform any or all of the following functions on a remote host processing system: collect and return specific data, determine the version of software and current software fixes, determine what applications are currently running, install new software or software patches, run diagnostics, shutdown or restart, launch applications, check for viruses, isolate computer from network, cleanse viruses, reattach computer to network, set up and manage ad hoc information sharing among computers, set up and manage ad hoc collaboration among operators, set up/shut down communications, and set up virtual LANs. Accordingly, the remote control middleware 20 on the remote host processing systems 16 preferably have Java™ Just-in-Time compilers or Java™ Developer Kits for compiling or translating agent-applications respectively into native machine language for the particular remote host processor 18 of the remote host processing system 16 on which the remote control middleware 20 is resident.

Figure 2:
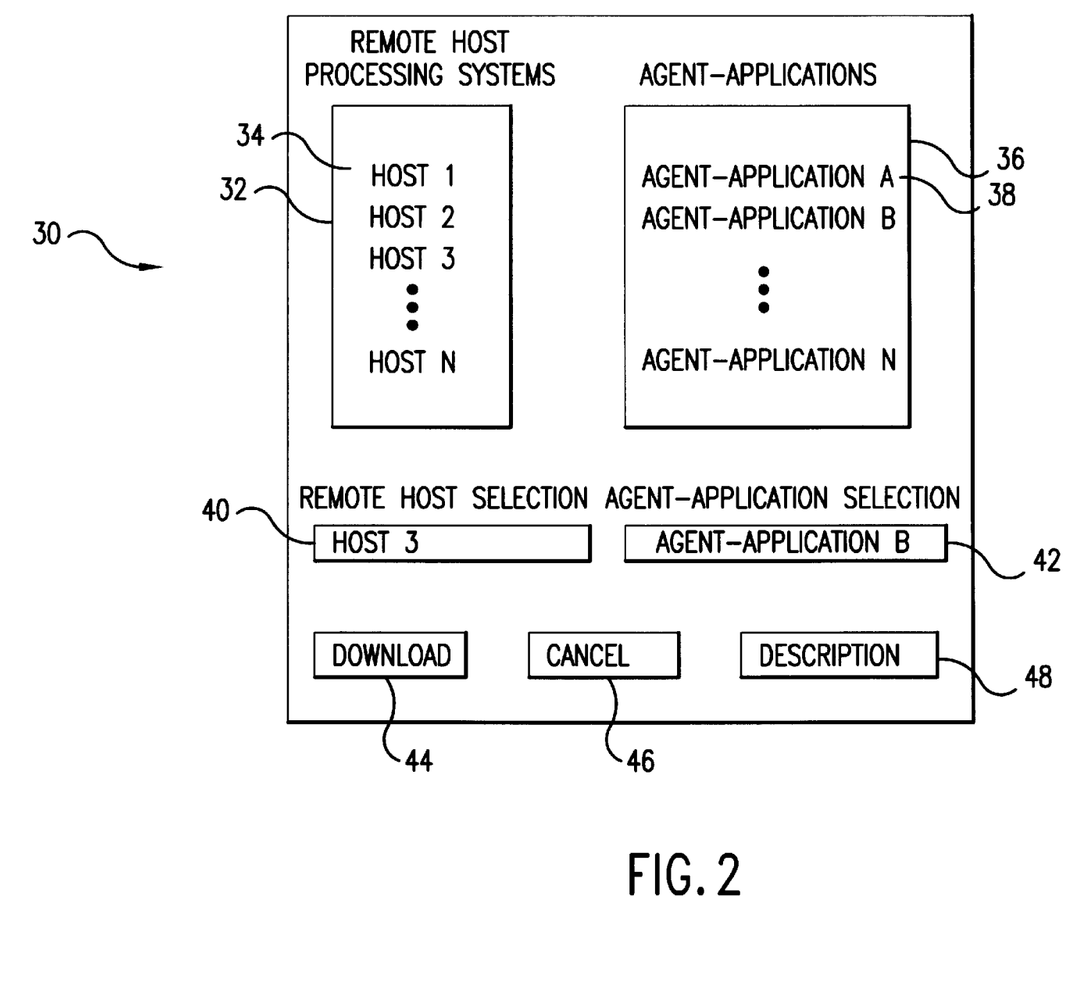
FIG. 2 is a screen display illustrating an aspect of a preferred embodiment of the present invention.
Figure 5:
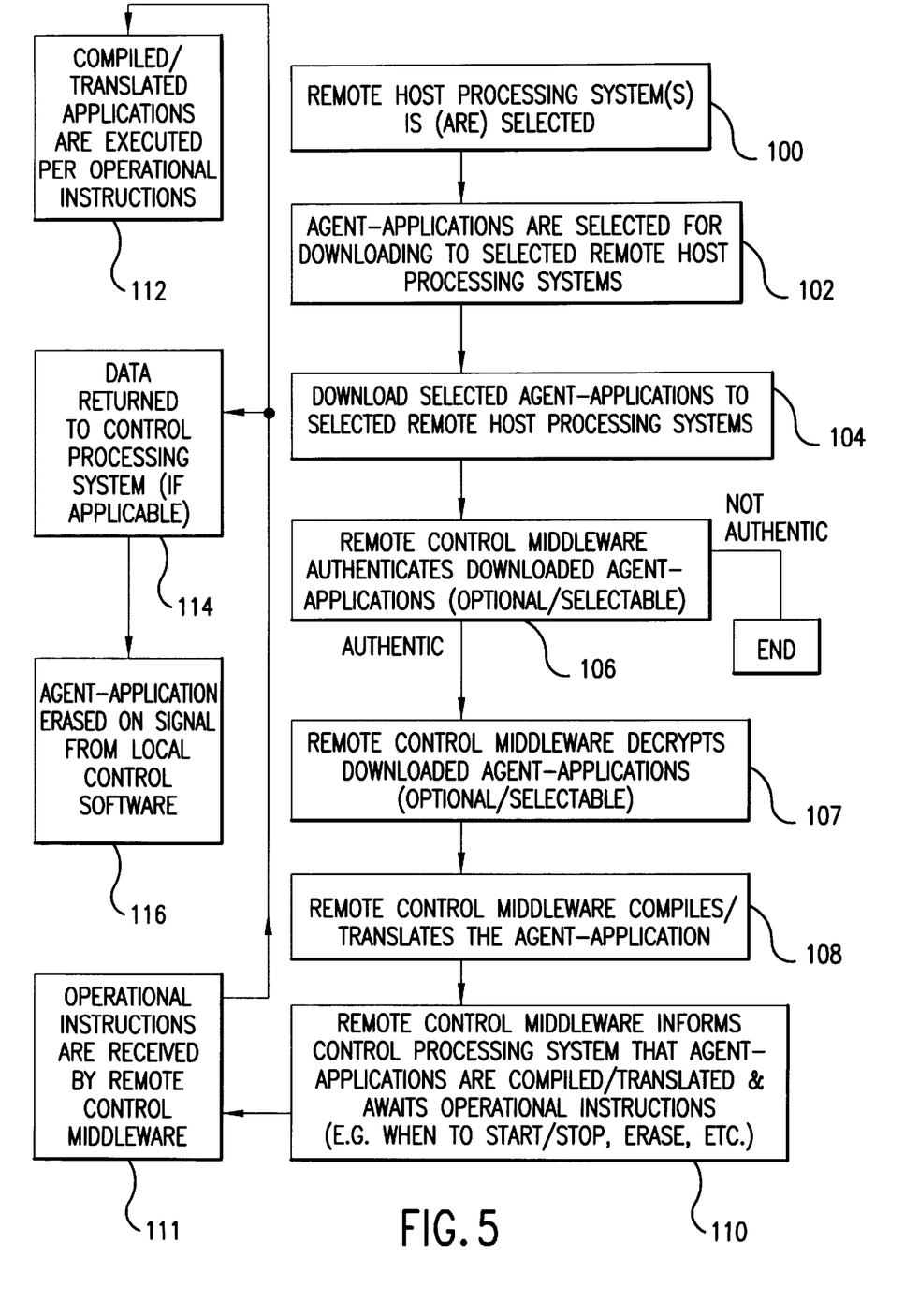
FIG. 5 is a flow chart illustrating an aspect of a preferred embodiment of the present invention.

With reference to FIG. 5, a user of a control processing system 10 (such as a manager or administrator) may select which remote host processing systems 16 that the user wishes to download agent-applications to at step 100 of the flow chart of FIG. 5. This step may be accomplished in a manner illustrated in FIG. 2 where the user is presented with local control software and a graphical user interface ("GUI") 11 such as screen display 30. The available remote host processing system window 32 lists the available remote host processing systems, and available agent-applications window 36 indicates available agent-applications which may be downloaded to the remote host processing systems. Remote host selection window 40 indicates which remote host processing system is currently selected and agent-application selection window 42 indicates which agent-application is currently selected. Once the desired remote host and agent-applications have been selected as indicated in windows 40 and 42, the selected agent-application(s) may be downloaded to the selected remote host by activating the download button 44. As will readily be appreciated by those skilled in the art, the remote host selection, agent-application selection, and download buttons may be activated by the use of any standard input device such as a keyboard, mouse or track ball or other means such as a touch screen. The description button 48 when activated will provide a short description of the currently selected agent-application, and activation of the cancel button 46 will cancel further downloading of the selected agent-application to the selected remote host and return the user to another GUI (graphical user interface) interface screen.

After the agent-applications have been selected for downloading and downloaded as described above and as indicated in the flow chart at steps 102 and 104 the program flow then proceeds to either step 106, or, optionally, directly to 107 or directly to 108.

At step 106, the remote control middleware authenticates each agent-application. If the agent-application is not authentic, the remote control middleware will discard the agent-application. At step 107 the remote control middleware decrypts the downloaded agent-application to the extent that encryption is being employed by the local control software. Steps 106 and 107 are both optional and may be set up to be selectable by the local control software. At step 108 the remote control middleware causes the compilation or translation of the agent-application(s) depending on the presence of a compiler or translator to convert the agent-applications into instructions in native code for the remote host processor of the remote host processing system on which the remote control middleware is resident. Once compilation or translation is completed, the remote control middleware informs the local control software that the agent-application are compiled or translated, and the remote control middleware then awaits operational instructions from the local control software. Such operational instructions may include instructions on when to run the downloaded agent-application, how and where to return data (if applicable), when to shut down the agent-application(s), and when to erase the agent-application(s). In the preferred embodiment, the remote control middleware monitors a predetermined port of the remote host computer constantly until instructions are received in any of several fashions known to those of skill in the art. Alternatively, the operational instructions may be downloaded with the agent-applications at step 104, and step 110 may therefore be skipped completely.

The compiled or translated agent-application(s) are then executed at step 112 according to the operational instructions received either at steps 104 or 110 and data is returned to the control processing system (if applicable) at step 114. Steps 112 and 114 may run concurrently. Step 114 may conclude before step 112. If agent-applications are to be erased after running, step 116 will be invoked.

Figure 3:
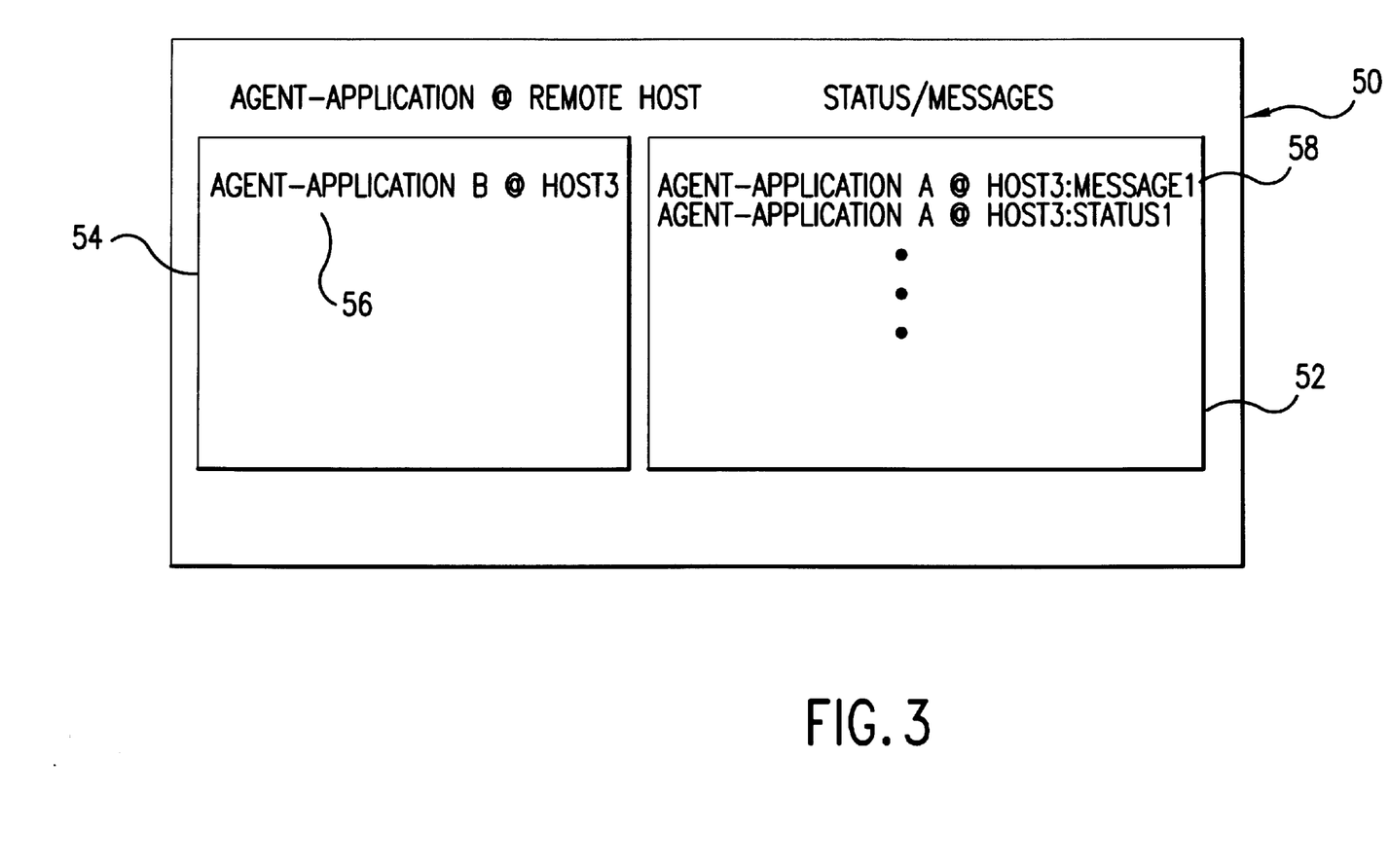
FIG. 3 is a screen display illustrating an aspect of a preferred embodiment of the present invention.

With reference to FIG. 3, screen display 50, in a preferred embodiment, displays in window 52 status messages, status information, or other desired information as reported by agent-applications running on the specific remote host 56 indicated in window 54.

Figure 4:
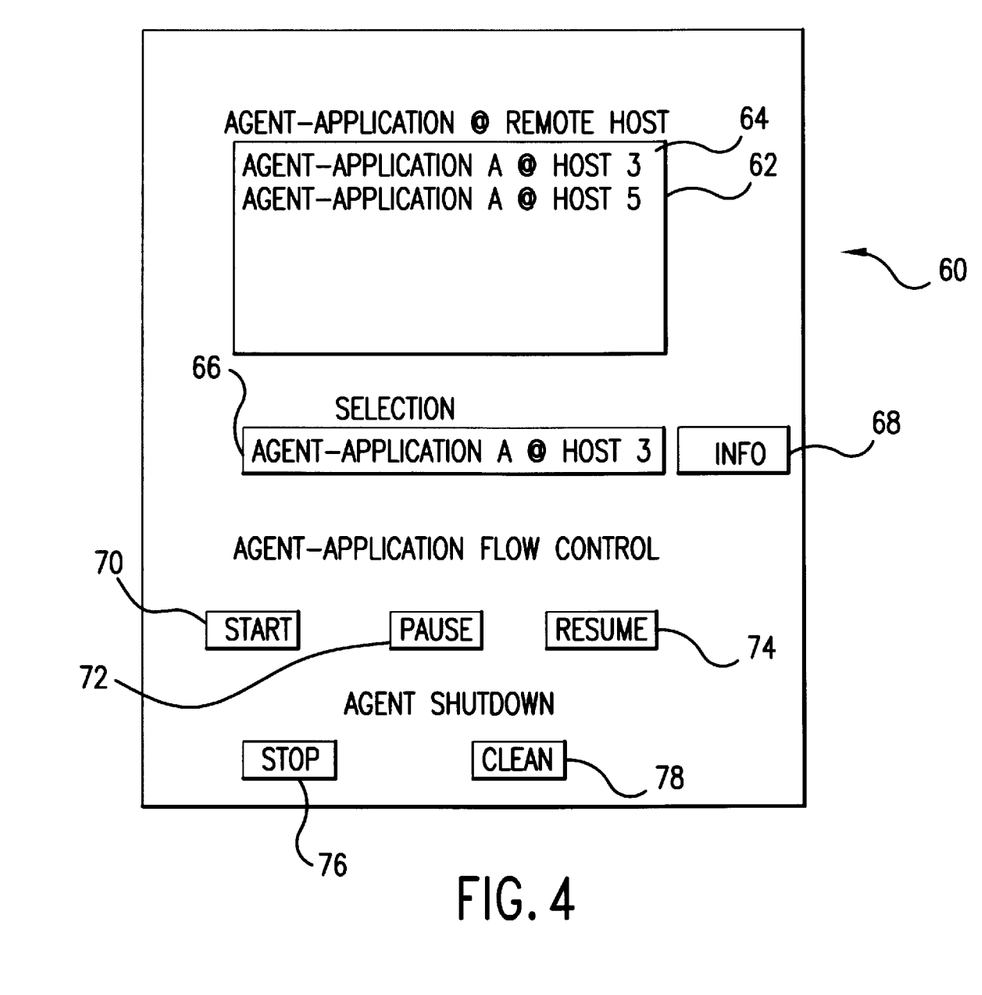
FIG. 4 is a screen display illustrating an aspect of a preferred embodiment of the present invention.

With reference to FIG. 4, screen display 60 illustrates one means available for a user to issue operational instructions to remote control middleware from a control processing system having a GUI and local control software. Window 62 lists available agent-applications at remote hosts 64 for selection. Window 66 indicates the currently selected agent-application. Buttons 70, 72 and 74 when activated will start selected agent-applications, pause selected agent-applications that are currently running, or resume running selected agent-applications which are currently paused respectively. Buttons 76 and 78 represent methods of terminating a running agent-application. When stop button 76 is activated, it will cause the termination of the selected agent-applications without removing it from the remote host processing system on which it is resident and clean button 78 when activated will cause the termination of the selected agent-applications if running and, in any event, will cause the removal of the agent-applications from the remote host processing system.

As the above demonstrates, each remote host processing system may have a different set of downloaded and/or running agent-applications from any other remote host processing system at any given time. Alternatively, each remote host processing system could have a set of application-agents identical to any other or all remote host processing systems.

The present invention has been described above with reference to preferred embodiments. However, those skilled in the art will recognize that changes and modifications may be made in these preferred embodiments without departing from the scope of the present invention.

What is claimed is:

1. A system for controlling one or more remote host processing systems comprising:

a communication medium;

a control group means comprising one or more control processing systems and at least one control storage means having a library stored thereon, wherein said library has one or more agent-applications which comprise instructions executable by one or more of said one or more remote host processing systems wherein each control processing system has
- a control processor,
- means for accessing at least one of said at least one control storage means,
- a control transceiver operatively connected to said communication medium for transmitting and receiving information including said agent-applications, and
- means for selecting one or more agent-applications from said library for transmission via said control transceiver to one or more of said one or more remote host processing systems; and
- wherein each of said one or more remote host processing systems has
  - a remote host processor,
  - a remote control middleware module, and
  - a remote transceiver operatively connected to said communication medium for sending and receiving information;
  - wherein each said remote control middleware module has means for converting any of said one or more agent-applications into instructions for said remote host processor of the one of said one or more remote host processing systems on which the remote control middleware is resident.

2. The system of claim 1 wherein said means for selecting one or more agent-applications comprises a graphical user interface.

3. The system of claim 1 wherein said remote control middleware module further comprises means for authenticating information received as having been sent from said control group.

4. The system of claim 1 wherein said control processing system further comprises means for modifying said agent-applications.

5. The system of claim 1 wherein said control processing system further comprises means for creating said agent-applications.

6. The system of claim 1 wherein said control processing system further comprises means for determining for any one of the said one or more remote host processing systems whether (a) said any one of said one or more remote host processing systems is operational, and (b) whether said remote control middleware module resident on any one of said one or more remote host processing systems is operational.

7. The system of claim 1 wherein said means for converting comprises a platform independent compiler or translator.

8. The system of claim 1 wherein said means for converting comprises an operating system independent compiler or translator.

9. The system of claim 1 wherein said agent-applications may be converted into instructions for plural types of remote host processors.

10. The system of claim 1 wherein said control processing system further comprises means for encrypting information prior to transmission.

11. The system of claim 10 wherein said remote control middleware module further comprises means for decrypting said encrypted information received from said control group.

12. A method for controlling one or more remote host processing systems, each having a remote host processor, from a control group comprising one or more control processing systems and at least one library comprising one or more agent-applications, each control processing system having access to said library, the steps comprising:
- activating a remote control middleware module resident on each remote host processing system;
- transmitting one or more of the one or more agent-applications from said control group to one or more of the one or more remote host processing systems;
- converting, as a function of the remote control middleware, said transmitted agent-applications into instructions for the remote host processor of the one or more remote host processing systems which have received the transmitted one or more agent-applications; and
- providing, as a function of the remote control middleware, the instructions to the remote host processor of the one or more remote host processing systems which have received the transmitted one or more agent-applications in the absence of a disable signal, for execution by said processors.

13. The method of claim 12 further comprising the step of selecting one or more agent-applications from said at least one library for the purpose of transmitting the selected agent-applications to one or more of said one or more host processing systems.

14. The method of claim 12 further comprising the steps of:
- encrypting said one or more agent-applications prior to said transmitting step; and
- decrypting said encrypted agent-applications after said transmitting step and prior to said converting step.

15. The method of claim 12 further comprising the step of verifying whether the information received from said control group is authentic and providing a disable signal if the information is not authentic.

16. The method of claim 12 wherein said system further comprises the steps of transmitting operational instructions from the control group to the remote control middleware module of one or more of said one or more remote host processing systems, and providing instructions to the remote host processor as a function of said operational instructions.

17. The method of claim 12 further comprising the step of erasing one or more of said transmitted agent-applications from a particular one of said one or more remote host processing systems upon said particular host processing system receiving a signal from said control group.

18. A computer program product, comprising:
- a computer readable storage medium having computer executable code recorded thereon for facilitating control by a control computer of a remote computer on which said computer program product is active, said computer executable code including
  - means for receiving one or more agent-applications from said control computer;
  - means for converting said received agent-applications into processor instructions which may be executed by said remote computer;
  - means for selectively executing said instructions on said remote computer; and
  - means for transmitting data to said control computer responsive to activities of said processor instructions which have been selectively executed.

19. The computer program product of claim 18 said computer executable code further comprising:
- means for controlling the execution of said processor instructions which have been selectively executed;

means for monitoring resources of said remote computer; and means for monitoring the status of said processor instructions which have been selectively executed.

20. The computer program product of claim 18 wherein said control computer comprises:

means for accessing a library of agent-applications; and local control software having     a download module for downloading agent-applications from said library to said remote computer,     a control module for providing control instructions to said remote computer to control the execution of said processor instructions which have been selectively executed thereon, and     a status module for receiving information from said remote computer regarding the status of said processor instructions which have been selectively executed thereon.

21. The computer program product of claim 20 wherein the control computer further comprises a graphical user interface for facilitating communication between a user and said local control software.

\* \* \* \* \*